(12) United States Patent
Bäckman et al.

(10) Patent No.: US 7,511,099 B2
(45) Date of Patent: Mar. 31, 2009

(54) POLYMER COMPOSITION

(75) Inventors: Mats Bäckman, Göteborg (SE); Eric Van Praet, Västra Frölunda (SE); Remco Van Marion, Porvoo (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/594,359

(22) PCT Filed: Mar. 26, 2004

(86) PCT No.: PCT/EP2004/003252

§ 371 (c)(1),
(2), (4) Date: Jul. 23, 2007

(87) PCT Pub. No.: WO2005/092974

PCT Pub. Date: Oct. 6, 2005

(65) Prior Publication Data

US 2007/0282067 A1    Dec. 6, 2007

(51) Int. Cl.
*C08L 23/04* (2006.01)
(52) U.S. Cl. .................................. 525/240; 138/177
(58) Field of Classification Search .................. 525/240; 138/177
See application file for complete search history.

(56) References Cited

U.S. PATENT DOCUMENTS 6,441,096 B1 * 8/2002 Backman et al. ............ 525/240

2004/0034169 A1 * 2/2004 Zhou et al. .................. 525/240

FOREIGN PATENT DOCUMENTS

| EP | 0 688 794 | 6/1995 |
| EP | 0 517 868 | 11/1995 |
| EP | 0 739 937 | 4/1996 |
| EP | 0 949 274 | 10/1999 |
| EP | 1 359 191 | 11/2003 |
| EP | 1 460 105 | 9/2004 |
| EP | 0 810 235 | 11/2004 |
| WO | WO 92/12182 | 7/1992 |
| WO | WO 95/12622 | 5/1995 |
| WO | WO 96/18662 | 6/1996 |
| WO | WO 02/34829 | 5/2002 |
| WO | WO 02/102891 | 12/2002 |

OTHER PUBLICATIONS

International Search Report corresponding to International Application No. PCT/EP2004/003252.
Schiers et al., *PE 100 Resins for Pipe Applications*, TRIP vol. 4, No. 12 (1996) pp. 408-415.
Githuku et al., *Elimination of Sag in Plastic Pipe Extrusion*, Intern. Polymer Processing VII (1992) 2, 140-143.
Pittman et al., *Cooling and Wall Thickness Uniformity in Plastic Pipe Manufacture*, Intern. Polymer Processing IX (1994) 2, 130-140.
*Encyclopedia of Polymer Science and Engineering*, 2$^{nd}$ Ed., vol. 14, pp. 492-509.

* cited by examiner

*Primary Examiner*—Caixia Lu
(74) *Attorney, Agent, or Firm*—Fay Sharpe LLP

(57) ABSTRACT

The invention relates to novel multimodal polyethylene polymers comprising a low molecular weight fraction and a high molecular weight fraction, and having a $MFR_5$ of greater than 0.10 g/10 min and less than or equal to 0.22 g/10 min, and a density of greater than equal to 952 kg/m$^3$. The invention also relates to uses of the novel polymers in the production of polymeric articles, especially pipes.

20 Claims, No Drawings

POLYMER COMPOSITION

The present invention relates a multimodal polyethylene polymer composition, and to its use in the production of polymeric articles, especially pipes.

Pipes constructed from polymer materials have a multitude of uses, such as fluid transport, i.e. the transport of liquids or gases, e.g. water or natural gas. During transport, it is normal for the fluid to be pressurised. Moreover, the transported fluid may have varying temperatures, usually within the range from about 0° C. to about 50° C. Such pressurised pipes are preferably constructed from polyolefin plastics usually unimodal or bimodal ethylene plastics such as medium density polyethylene (MDPE; density: 0.930-0.942 g/cm$^3$) and high density polyethylene (HDPE; density: 0.942-0.965 g/cm$^3$).

The expression "pressure pipe" used herein refers to a pipe which, when used, is subjected to a positive pressure, that is the pressure inside the pipe is higher than the pressure outside the pipe.

Polymeric pipes are generally manufactured by extrusion, or, to a smaller extend, by injection moulding. A conventional plant for extrusion of polymer pipes comprises an extruder, a die-head, a calibrating device, cooling equipment, a pulling device, and a device for cutting and/or for coiling-up the pipe.

The manufacture of PE materials for use in pressure pipes is discussed in an article by Scheirs et al (Scheirs, Böhm, Boot and Leevers: PE100 Resins for Pipe Applications, TRIP Vol. 4, No 12 (1996) pp. 408-415). The authors discuss the production technology and properties of PE100 pipe materials. They point out the importance of proper comonomer distribution and molecular weight distribution in order to optimise slow crack growth and rapid crack propagation.

European patent application EP 739 937 A2 discloses a pipe having improved properties. The pipe is made of a bimodal PE resin, and has a specified stress cracking resistance, impact strength and stiffness. The publication discloses that preferably the material should have an MFR$_5$ not higher than 0.35 g/10 min.

Whilst the properties of conventional polymer pipes are sufficient for many purposes, enhanced properties may also be desired, for instance in applications requiring high pressure resistance, i.e. pipes that are subjected to an internal fluid pressure for long and/or short periods of time.

It is also desirable to improve following properties: processability, impact strength, modulus of elasticity, rapid crack propagation resistance, slow crack growth resistance, and design stress rating of the pipe.

A problem when manufacturing large diameter pipes, particularly from multimodal, such as bimodal, polymeric materials, is that it is difficult to maintain uniform dimensions around the pipe. That is due to gravity flow of the polymer melt, causing it to flow from an upper part of the pipe to a lower part (often called "sagging"). Thus, the wall thickness at the upper part of the pipe becomes smaller than at the lower part of the pipe. The sagging problem is particularly pronounced for thick-walled large diameter pipes.

The problem of sagging has been discussed in German patent application DE 196 04 196 A1. The patent application discloses a process for manufacturing a large-bore, thick walled pipe of polyethylene. The pipe is extruded through a ring formed die and cooled on both inner and outer surfaces. The double-sided cooling is said to eliminate deformation of the pipe due to gravity-induced flow of the melt emerging from the die.

The problem of sagging has also been discussed in an article by D. N. Githuku and A. J. Giacomin, "Elimination of Sag in Plastic Pipe Extrusion", Intern. Polymer Processing VII (1992) 2, 140-143. The hitherto conventional way to reduce sag is by manually adjusting the die eccentricity which typically requires three or four tries at start-up to arrive at an acceptable thickness profile. The article proposes a new way to reduce sag, namely by rotating the pipe during cooling.

A mathematical mode of cooling and solidification, coupled with gravity induced flow during the cooling of extruded plastic pipes, is set up and solved by the finite element method in an article by J. F. T. Pittman, G. P. Whiteman, S. Beech, and D. Gwynn, "Cooling and Wall Thickness Uniformity in Plastic Pipe Manufacture", Intern. Polymer Processing IX (1994) 2, 130-140. Melt rheology and determination of melt flow properties at very low stress levels that are relevant to sag are also discussed.

According to ISO 9080, a possible new pressure class for PE would be made to meet PE125 requirements, not realized today. This means that the pipes can withstand a pipe wall stress of 12.5 MPa for 50 years at 20° C. without fracturing.

It has now been discovered that pipes meeting the PE125 requirement, and which do not sag can be prepared from a specific, well defined type of multimodal polyethylene.

More specifically, the multimodal polyethylene should have a high density, a low melt index, and a carefully selected ratio between its low molecular weight fraction and high molecular weight fraction.

According to the present invention there is provided a multimodal polyethylene polymer composition comprising a low molecular weight ethylene homo-polymer fraction and a high molecular weight ethylene copolymer fraction, characterised in that:

the low molecular weight fraction is present in an amount of 45 to 55% by weight;

the high molecular weight fraction is present in an amount of 45 to 55% by weight;

the polymer has a MFR$_5$ of greater than 0.10 g/10 min and less than or equal to 0.22 g/10 min; and the polymer has a density of greater than or equal to 952 kg/m$^3$ Preferably, the low molecular weight fraction is present in an amount of 47 to 52% by weight Further preferred, the high molecular weight fraction is present in an amount of 48 to 53% by weight.

The expression "modality of a polymer" refers to the form of its molecular weight distribution (MWD) curve, i.e. the appearance of the graph of the polymer weight fraction as a function of its molecular weight. If the polymer is produced in a sequential step process e.g. by utilising reactors coupled in series, and using different conditions in each reactor, the different polymer fractions produced in the different reactors will each have their own molecular weight distribution which may considerably differ from one another.

The molecular weight distribution curve of the resulting final polymer can be looked at by superimposing of the molecular weight distribution curves of the polymer fractions which will accordingly show two or more distinct maxima, or at least be distinctly broadened compared with the curves for the individual fractions. A polymer showing such a molecular weight distribution curve is called "bimodal" or "multimodal", respectively.

By properly selecting the different polymer fractions and the proportions thereof in the multimodal polyethylene, a pipe which meets PE125, with low tendency for sagging, good processability, good slow crack growth resistance, good rapid crack propagation resistance, good weldability in accordance with e.g. German welding standard from Deutsche Verein für Schweißtechnik DVS 2203 part 4 and Danish standard DS/INF 70-5, and high design stress rating can be produced.

The multimodal ethylene is preferably a bimodal polyethylene.

Multimodal polymers can be produced according to several processes which are described e.g. in WO 92/12182.

The multimodal polyethylene is preferably produced in a multi-stage process in a multi-step reaction sequence such as described in WO 92/12182. The contents of this document are included herein by reference.

It is previously known to produce multimodal, in particular bimodal, olefin polymers, such as multimodal polyethylene, in two or more reactors connected in series. As instance of this prior art, mention may be made of WO 96/18662, which is hereby incorporated by way of reference as regards the production of multimodal polymers.

According to the present invention, the main polymerisation stages are preferably carried out as a combination of slurry polymerisation/gas-phase polymerisation. The slurry polymerisation is preferably performed in a so-called loop reactor.

In order to produce the inventive composition of improved properties, a flexible method is required. For that reason, it is preferred that the composition be produced in two main polymerisation stages in a combination of loop reactor/gas-phase reactor.

Optionally and advantageously, the main polymerisation stages may be preceded by a prepolymerisation, in which case up to 20% by weight, preferably 1-10% by weight, more preferably 1-5% by weight, of the total amount of polymer is produced. The prepolymer is preferably an ethylene homopolymer (HDPE). At the prepolymerisation point, all of the catalyst is preferably charged into a loop reactor and the prepolymerisation is performed as a slurry polymerisation. Such a prepolymerisation leads to less fine particles being produced in the following reactors and to a more homogeneous product being obtained in the end.

Generally, the technique results in a multimodal polymer mixture through polymerisation with the aid of a Ziegler-Natta or metallocene catalyst in several successive polymerisation reactors. In the production of, for example, a bimodal polyethylene, which according to the invention is the preferred polymer, a first ethylene polymer is produced in a first reactor under certain conditions with respect to hydrogen-gas concentration, temperature, pressure, and so forth. After the polymerisation in the first reactor, the polymer including the catalyst is separated from the reaction mixture and transferred to a second reactor, where further polymerisation takes place under other conditions.

Usually, a first polymer of high melt flow rate and low molecular weight, LMW, is produced with no addition of comonomer in the first reactor, whereas a second polymer of low melt flow rate and high molecular weight, HMW, is produced with addition of comonomer in the second reactor. As comonomer of the HMW fraction preferably one or more alpha-olefins are used. More preferably, alpha-olefins with 6 to 12 carbon atoms are used, which may be preferably selected from the group consisting of 1-hexene, 4-methyl-1-pentene, 1-heptene, 1-octene, 1-nonene, 1-decene, 6-methyl-1-heptene, 4-ethyl-1-hexene, 6-ethyl-1-octene and 7-methyl-1-octene. Still more preferably, the comonomer is an alpha-olefin with 7 to 10 carbons, and may be selected from 1-heptene, 1-octene and 1-nonene.

The amount of comonomer is preferably such that it comprises 0.1 to 2.0 mol %, more preferably 0.1 to 1.0 mol % of the multimodal polyethylene. The resulting end product consists of an intimate mixture of the polymers from the two reactors, the different molecular-weight-distribution curves of these polymers together forming a molecular-weight-distribution curve having a broad maximum or two maxima, i.e. the end product is a bimodal polymer mixture. Since multimodal, and especially bimodal, ethylene polymers, and the production thereof belong to the prior art, no detailed description is called for here, but reference is made to the above mentioned EP 517 868. It will be noted that the order of the reaction stages may be reversed.

Preferably, as stated above, the multimodal polyethylene composition according to the invention is a bimodal polymer mixture. It is also preferred that this bimodal polymer mixture has been produced by polymerisation as above under different polymerisation conditions in two or more polymerisation reactors connected in series.

In a preferred embodiment of the polymerisation in a loop reactor followed by a gas-phase reactor, the polymerisation temperature in the loop reactor is preferably 75 to 110° C., more preferably 92 to 100° C. and in particular about 95° C. and the temperature in the gas-phase reactor preferably is 75 to 110° C., and more preferably 82 to 90° C.

A chain-transfer agent, preferably hydrogen, is added as required to the reactors, and preferably 200 to 800 moles of $H_2$/kmoles of ethylene are added to the reactor, when the LMW fraction is produced in this reactor, and 0 to 50 moles of $H_2$/kmoles of ethylene are added to the gas phase reactor when the reactor is producing the HMW fraction.

As indicated earlier, the catalyst for polymerising the multimodal polyethylene of the invention preferably is a Ziegler-Natta type catalyst. Particularly preferred are catalysts with a high overall activity as well as a good activity balance over a wide range of hydrogen partial pressures. Furthermore, the molecular weight of the polymer produced by the catalyst is of great importance. As an example of a preferred catalyst, mention is made of the catalyst disclosed in FI 980788 and its corresponding PCT application PCT/FI99/00286. It has surprisingly been found that when using this catalyst in a multi-stage process, it is possible to obtain a polymer having the characteristics described above. The catalyst also has the advantage that it (procatalyst and cocatalyst) only needs to and, indeed, only should be added in the first polymerisation reactor.

FI 980788 and its corresponding PCT application PCT/FI99/00286 discloses a process for the production of a high activity procatalyst.

Further preferred Ziegler-Natta catalysts for the production of the multimodal polyethylene of the invention are also those described in EP 810 235.

Still further preferred Ziegler-Natta catalysts are also those produced according to a process comprising a catalyst component formed by contacting at least: (a) a compound of group 1 to 3 of the Periodic Table (IUPAC), with (b) a transition metal compound of group 4 to 10 of the Periodic Table (IUPAC), or a compound of an actinide or lanthanide; in the form of solid catalyst particles, comprising:

preparing a solution from the compounds;
dispersing said solution to a solvent immiscible therewith and inert in relation to said compounds;
to obtain an emulsion in which said solution forms the dispersed phase; and
solidifying the catalyst component in the dispersed droplets; and optionally
recovering the solid catalyst particles.

Finally, further preferred Ziegler-Natta catalysts are also those produced in a process comprising a catalyst component formed by contacting at least:

(a) a compound of group 1 to 3 of the Periodic Table (IUPAC) with (b) a chlorine-containing transition metal compound of group 4 to 10 of the Periodic Table (IUPAC) and/or a chlorine-containing compound of group 13 of the Periodic Table (IUPAC);

in the form of solid catalyst particles, comprising:
    preparing a solution from said compounds;
    dispersing said solution to a solvent immiscible therewith and inert in relation to the compounds;
    to obtain an emulsion in which said solution forms the dispersed phase; and
    solidifying the catalyst component in the dispersed droplets; and optionally
    recovering the solid catalyst particles.

The catalyst for the production of the ethylene polymer may also be a chromium, or a single-site catalyst.

Preferably, the single-site catalyst is a metallocene catalyst.

Preferred single-site catalysts are described in EP 688 794, EP 949 274, WO 95/12622 and WO 00/34341. The contents of these documents are included herein by reference.

Multimodal polymers, in particular ethylene polymers, show superior mechanical properties, which are, for example, low shrinkage, low abrasion, hard surface and good barrier properties by a good processability.

The multimodal polyethylene comprises a low molecular weight (LMW) ethylene homopolymer fraction and a high molecular weight (HMW) ethylene homo- or copolymer fraction. Depending on whether the multimodal ethylene polymer is bimodal or has a higher modality, the LMW and/or HMW fraction may comprise only one fraction each or two or more sub-fractions.

The low molecular weight (LMW) fraction has a weight average molecular weight of about 5000 to 50000 g/mol, a melt index $MFR_2$ of about 100 to 2000 g/10 min, a content of alpha-olefin comonomer of less than about 0.5% by mole and a density of about 965 to 977 kg/m$^3$.

The high molecular weight (HMW) fraction has a weight average molecular weight of about 300000 to 900000 g/mol, a melt index $MFR_{21}$, of about 0.01 to 1 g/10 min, a content of comonomer of 0.4 to 4.0% by mol and a density of about 915 to 935 kg/m$^3$.

The expression "ethylene homopolymer" as used herein refers to an polyethylene that consists substantially, i.e. to at least 97% by weight, preferably at least 99% by weight, more preferably at least 99.5% by weight and most preferably at least 99.8% by weight of ethylene.

Preferably, the ethylene polymer is a bimodal polymer consisting of one LMW fraction and one HMW fraction.

As stated above, the co-monomer of the high molecular weight copolymer preferably is a $C_6$ to $C_{12}$ alpha-olefin, more preferably a $C_8$ to $C_{10}$ alpha-olefin.

The ethylene homo-polymer preferably has a $MFR_2$ of about 300 to 2000 g/10 min.

The molecular weight distribution of the polymer composition is characterized by way of its melt flow rate (MFR) according to ISO 1133. The melt flow rate is primarily dependent on the mean molecular weight. That is because, long well-packed molecules give a material a smaller flow tendency than short, less packed molecules. An increase in molecular weight means a decrease in MFR value. The melt flow rate is measured in g/10 min of the polymer discharge under specified temperature and pressure conditions and is a measure of the viscosity of the polymer, which in turn for each type of polymer is mainly influenced by its molecular weight distribution, but also by its degree of branching etc.

The melt flow rates are measured under a load of 2.16 kg denoted as $MFR_2$, at 5 kg which is denoted as $MFR_5$, and at 21.6 kg which is denoted as $MFR_{21}$, all in accordance with ISO 1133.

The polymer also preferably has a density of greater than or equal to 953 kg/m$^3$.

The polymer composition of the present invention preferably has a dynamic viscosity, at a shear stress of 2.7 kPa, of at least 300000 Pa·s, preferably at least 350000 Pa·s.

It is also preferable for the polymer to have a shear thinning index of 70 or greater, preferably 100 or greater and in particular 130 or greater.

The polymer composition may further comprise additives, such as, pigments, e.g. carbon black and phtalocyanine; stabilisers/antioxidants, e.g. Irganox 1010, Irgafos 168, and blends such as Irganox B225; and neutralising additives, e.g. calcium stearate and zinc stearate.

According to another aspect of the invention there is provided use of the polymer composition according to the present invention in the production of a polymeric article, especially a pipe.

In order to achieve the non-sagging characteristics of the multimodal polyethylene composition of the present invention, it is important to ensure that the polymer, after being, for example, extruded into a pipe and before being cooled, does not flow by gravity from the upper part of the pipe to a lower part and therefore create a non-uniform distribution of polymer around the cross-section of the pipe.

The tendency of a polymer to display gravity flow may be determined by means of a conventional melt index apparatus, such as a Göttfert melt index apparatus. Generally, a polymer sample is introduced into the bore (9.550 mm diameter, ISO 1133) of the melt index apparatus, the temperature is set at 230° C., the bottom die is removed, and the polymer loaded with a weight corresponding to the force of gravity that would have acted upon the polymer if it had constituted the upper part of a pipe. It has been found that the piston (which weighs 120 g) of the melt index apparatus corresponds to the gravity force on the polymer at the upper part of a 2.2 m diameter pipe, and it is therefore suitable to use the piston without any extra weight as the gravity force acting upon the polymer sample. During the test the polymer flow is determined at intervals for 75 min and the average gravity flow is then determined in mm/10 min. With the polymer of the present invention the gravity flow of the polymer is preferably less than 0.1 mm/10 min. The gravity flow determination method is described in further detail below:

1. Set the temperature to 230° C. and let it stabilise;
2. Weight the piston to an accuracy of 0.1 g;
3. When the temperature is stable insert 6-8 g of the material to be measured;
4. Let the material heat soak for 10 min;
5. After 10 min open the bottom holder for the die and press out the die by pressing the melt pool from above;
6. Take away the die and apply the piston. Press down the piston until the lower marking scratch on the piston is 29 mm above the filling hole;
7. Let the melt pool relax for 10 min as some materials have a more pronounced melt elasticity than others and the induced elasticity from the pressing down of the melt pool may influence the result;
8. Start the measurement by measuring the height of the lower marking scratch above the filling hole with a sliding caliper to an accuracy of 0.1 mm. Start the stop watch;
9. Make a measurement of the height above the filing hole each 20 min and make a final measurement after 75 min; and 10. Make notes and present the results of the height each 20 min. Calculate the travelling distance each 20 min in mm as well as the travelling speed expressed as mm/10 min. Finally calculate the average travelling distance and velocity after 75 min (travel. dist/75) and make a report.

Another method which correlates well with the above described gravity flow method, and is used in connection with the present invention relates to the rheology of the polymer and is based on determination of the viscosity of the polymer at a very low, constant shear stress. A shear stress of 747 Pa has been selected for this method. The viscosity of the polymer at this shear stress is determined at a temperature of 190° C. and has been found to be inversely proportional to the gravity flow of the polymer, i.e. the greater the viscosity the lower the gravity flow.

The determination of the viscosity at 747 Pa shear stress is made by using a constant stress rheometer, which can be e.g. a Bohlin CS Melt Rheometer. Rheometers and their function have been described in "Encyclopedia of Polymer Science and Engineering", 2nd Ed., Vol. 14, pp. 492-509. The measurements are performed under a constant stress between two 25 mm diameter plates (constant rotation direction). The gap between the plates is 1.8 mm. An 1.8 mm thick polymer sample is inserted between the plates.

The sample is temperature conditioned during 2 min before the measurement is started. The measurement is performed at 190° C. After temperature conditioning the measurement starts by applying the predetermined stress. The stress is maintained during 1800 s to let the system approach steady state conditions. After this time the measurement starts and the viscosity is calculated.

The measurement principle is to apply a certain torque to the plate axis via a precision motor. This torque is then translated into a shear stress in the sample. This shear stress is kept constant. The rotational speed produced by the shear stress is recorded and used for the calculation of the viscosity of the sample.

Rheology measurements according to ASTM D 4440-95a may also be used to characterise other important properties of the polymer, such as the molecular weight and molecular weight distribution (MWD).

The use of rheology is advantageous in those cases where the high molecular weight end of the molecular weight distribution is important. Typically, size exclusion chromatography (gel permeation chromatography), which often is used to measure the molecular weight distribution, is not sensitive enough in this molecular weight range.

The storage modulus (G') and the loss modulus (G") together with the absolute value of the complex viscosity ($\eta^*$) as a function of the frequency ($\omega$) or the absolute value of the complex modulus (G*) are obtained by dynamic rheology measurements.

$$\eta^* = \sqrt{(G'^2 + G''^2)}/\omega$$

$$G^* = \sqrt{(G'^2 + G''^2)}$$

According to Cox-Merz rule the complex viscosity function, $\eta^*$ ($\omega$) is the same as the conventional viscosity function (viscosity as a function of shear rate), if frequency is taken in rad/s. If this empiric equation is valid, the absolute value of the complex modulus corresponds to the shear stress in conventional (that is steady state) viscosity measurements. This means that the function $\eta^*$ (G*) is the same as the viscosity as a function of shear stress.

In the present method the viscosity at a low shear stress or $\eta^*$ at a low G* (which serves as an approximation of the so called zero viscosity) is used as a measure of average molecular weight.

According to the invention, and as stated above, $\eta_{2.7\ kpa}$ (viscosity at 2.7 kPa shear stress) should be greater than 300 kPa·s, preferably 350 kPa·s.

On the other hand, shear thinning, that is the decrease of viscosity with G*, gets more pronounced the broader the molecular weight distribution is. This property can be approximated by defining a so called shear thinning index, SHI, as a ratio of the viscosity at two different shear stresses. In the present invention the shear stresses (or G*) 2.7 kPa and 210 kPa are used for calculating the $SHI_{2.7/210}$ as a measure of the broadness of the molecular weight distribution.

$$SHI_{2.7/210} = \eta^*_{2.7}/\eta^*_{210}$$

where
$\eta^*_{2.7}$ is the complex viscosity at G*=2.7 kPa and
$\eta^*_{210}$ is the complex viscosity at G*=210 kPa.

According to the invention, $SHI_{2.7/210}$ should be between 50 to 150, preferably 100 to 150, and more preferably 130 to 150.

The rapid crack propagation (RCP) resistance of a pipe may be determined according to a method called the S4 test (Small Scale Steady State), which has been developed at Imperial College, London, and which is described in ISO 13477:1997(E). According to the RCP-S4 test a pipe is tested, which has an axial length not below 7 pipe diameters. The outer diameter of the pipe is about 110 mm or greater and its wall thickness about 10 mm or greater. When determining the RCP properties of a pipe in connection with the present invention, the outer diameter and the wall thickness have been selected to be 110 mm and 10 mm, respectively. While the exterior of the pipe is at ambient pressure (atmospheric pressure), the pipe is pressurised internally, and the internal pressure in the pipe is kept constant at a pressure of 0.5 MPa positive pressure. The pipe and the equipment surrounding it are thermostatted to a predetermined temperature. A number of discs have been mounted on a shaft inside the pipe to prevent decompression during the tests. A knife projectile is shot, with well-defined forms, towards the pipe close to its one end in the so-called initiating zone in order to start a rapidly running axial crack. The initiating zone is provided with an abutment for avoiding unnecessary deformation of the pipe. The test equipment is adjusted in such a manner that crack initiation takes place in the material involved, and a number of tests are effected at varying temperatures. The axial crack length in the measuring zone, having a total length of 4.5 diameters, is measured for each test and is plotted against the set test temperature. If the crack length exceeds 4 diameters, the crack is assessed to have propagated. If the pipe passes the test at a given temperature, the temperature is lowered successively until a temperature is reached, at which the pipe no longer passes the test, but the crack propagation exceeds 4 times the pipe diameter. The critical temperature ($T_{crit}$) i.e. the ductile brittle transition temperature as measured according to ISO 13477:1997(E) is the lowest temperature at which the pipe passes the test. The lower the critical temperature the better, since it results in an extension of the applicability of the pipe. It is desirable for the critical temperature to be lower than around +2° C. A pressure pipe made of the multimodal polymer composition according to the present invention preferably has an RCP-S4 value of −2° C. or lower, more preferably −7° C. or lower and in particular −10° C. or lower.

The design stress rating is the circumferential stress a pipe is designed to withstand for 50 years without failure and is determined for different temperatures in terms of the Minimum Required Strength (MRS) according to ISO/TR 9080. Thus, MRS8.0 means that the pipe is a pipe withstanding a hoop stress of 8.0 MPa gauge for 50 years at 20° C., and similarly MRS10.0 means that the pipe withstands a hoop stress of 10 MPa gauge for 50 years at 20° C. A pressure pipe made of this multimodal polymer composition according to the present invention preferably has a design stress rating of at least MRS12.5.

The slow crack propagation resistance is determined according to ISO 13479:1997 in terms of the number of hours the pipe withstands a certain pressure at a certain temperature before failure. A pressure pipe made of the multimodal polymer composition according to the present invention preferably has a slow crack propagation resistance of at least 165 h at 5.6 MPa/80° C., more preferably at least 200 h at 5.6 MPa/80° C. and in particular at least 500 h at 5.6 MPa/80° C.

The modulus of elasticity is determined according to ISO 527-2. A pressure pipe made of the multimodal polymer composition according to the present invention preferably has a modulus of elasticity of at least 1400 N/mm$^2$.

The density is measured according to ISO 1183-1987.

The molecular weight distribution is measured by using size exclusion chromatography (SEC). In the examples this was done by using a Waters 150 CV plus no. 1115. A refractive index (RI) detector and a viscosity detector were used. The instrument was calibrated with a narrow molecular weight distribution polystyrene sample. The columns were 3 HT6E styragel from Waters at an oven temperature of 140° C.

According to a further aspect of the invention there is provided a pipe produced using a polymeric composition according to the present invention.

The present invention will now be described by way of example:

EXAMPLES 1-3

Tables 1 to 4 contain data relating to Examples 1, 2 and 3.

All of the examples were produced in a pilot plant, comprising a 500 dm$^3$ loop reactor and a gas phase reactor. Between the reactors a flash is used, to remove the volatile components from the polymer, before the polymer is transferred into the gas phase reactor. The loop reactor was operated at 95° C. temperature and 60 bar pressure. Propane diluent, ethylene, hydrogen and a polymerisation catalyst (a magnesium dichloride based titanium chloride catalyst, manufactured and marketed by Engelhard under the trade name of Lynx 200™. Triethylaluminium was used as a cocatalyst, so that the molar ratio of aluminium in the cocatalyst to titanium in the solid catalyst component was about 20) were introduced into the reactor with such flow rates that the reactor conditions and polymer properties were as shown in table 1.

TABLE 1

| | | Example | | |
|---|---|---|---|---|
| | | 1 | 2 | 3 |
| $C_2$ concentration | mol-% | 5.5 | 6.0 | 5.4 |
| $H_2/C_2$ ratio | mol/kmol | 787 | 736 | 769 |
| $MFR_2$ | dg/min | 450 | 300 | 540 |
| Comon./$C_2$ ratio | mol/kmol | 0 | 0 | 0 |
| Production rate | kg/h | 42 | 41 | 40 |
| Molecular weight (weight average) | g/mol | 22400 | 29700 | 29100 |

The polymers were then transferred into a gas phase reactor, operated at 85° C. temperature and 20 bar pressure. Into the reactor were further introduced ethylene, 1-hexene comonomer, hydrogen and nitrogen, so that the conditions and the polymer properties were as shown in table 2.

TABLE 2

| | | Example | | |
|---|---|---|---|---|
| | | 1 | 2 | 3 |
| $C_2$ concentration | mol-% | 10.6 | 12.6 | 11.6 |
| $H_2/C_2$ ratio | mol/kmol | 31 | 32 | 32 |
| $C_6/C_2$ ratio | mol/kmol | 21 | 19 | 25 |
| $MFR_2$ | g/10 min | — | — | — |
| $MFR_5$ | g/10 min | 0.24 | 0.18 | 0.19 |
| $MFR_{21}$ | g/10 min | 8.6 | 6.6 | 7.3 |
| Density | kg/m$^3$ | 953 | 954 | 953 |
| Split | LMW/HMW | 50/50 | 50/50 | 50/50 |

The powder collected from the gas phase reactor was dried, mixed with 2200 ppm Irganox B225, 1500 ppm calcium stearate and 57500 ppm HE0880, which is a carbon black containing masterbatch. The polymer was, after mixing, pelletised on a JSW CIM90P extruder. The data of the final resin produced is shown in tables 3 and 4.

TABLE 3

| | | Example | | |
|---|---|---|---|---|
| | | 1 | 2 | 3 |
| $MFR_5$ | g/10 min | 0.19 | 0.18 | 0.18 |
| $MFR_{21}$ | g/10 min | 9.3 | 6.8 | 7.0 |
| $MFR_{21/5}$ | | 49 | 38 | 39 |
| Density (column) | kg/m$^3$ | 966 | 965 | 964 |

Further measurements, of each Example, were made, and are shown in table 4.

TABLE 4

| | | Example | | |
|---|---|---|---|---|
| | | 1 | 2 | 3 |
| Flex. Mod | N/mm$^2$ | 1408 | 1408 | 1380 |
| CTL | hours | >2490 | 1192 | >2277 |
| Notch test 5.6 (11.2 bar) | MPa | 239 | — | — |
| eta/2.7 | Pa·s | 433000 | 562000 | 474000 |
| SHI/2.7/210 | | 104 | 106 | 106 |
| Sagging | mm/10 min | 0.04 | — | — |
| Mn | | 4990 | 4870 | 7490 |
| Mw | | 403000 | 442000 | 437000 |
| MWD | | 81 | 91 | 58 |
| 1-hexene content | wt % | 1.4 | 1.2 | 1.2 |
| 1-hexene content | mol % | 0.47 | 0.40 | 0.40 |

The invention claimed is:

1. A multimodal polyethylene polymer comprising a low molecular weight ethylene homo-polymer fraction and a high molecular weight ethylene copolymer fraction, wherein:
   the low molecular weight fraction is present in an amount of 47 to 52% by weight;
   the high molecular weight fraction is present in an amount of 48 to 53% by weight;
   the multimodal polymer has a $MFR_5$ of greater than 0.10 g/10 min; and less than or equal to 0.22 g/10 min; and
   the multimodal polymer has a density of greater than or equal to 952 kg/m$^3$.

2. A multimodal polyethylene polymer according to claim 1 wherein the polymer has a density of greater than or equal to 953 kg/m$^3$.

3. A multimodal polyethylene polymer according to claim 1 wherein the polymer has a dynamic viscosity, at a shear stress of 2.7 kPa, of at least 300,000 Pa·s.

4. A multimodal polyethylene polymer according to claim 1 wherein the polymer has a shear thinning index of 70 or greater.

5. A multimodal polyethylene polymer according to claim 1 wherein the co-monomer of the high molecular weight ethylene copolymer is a $C_6$ to $C_{12}$ alpha-olefin.

6. A multimodal polyethylene polymer according to claim 5 wherein the co-monomer is a $C_8$ to $C_{10}$ alpha-olefin.

7. A multimodal polyethylene polymer according to claim 1, wherein the ethylene homo-polymer has a MFR$_2$ of about 300 to 2000 g/10 min.

8. In the method of forming a pipe or conduit from a polymeric material, the improvement comprising forming said pipe or conduit from the polymer composition of claim 1.

9. Pipe or conduit formed from the composition of claim 1.

10. A multimodal polyethylene polymer according to claim 1 wherein the polymer has a density of greater than or equal to 953 kg/m$^3$.

11. A multimodal polyethylene polymer according to claim 1 wherein the polymer has a dynamic viscosity, at a shear stress of 2.7 kPa, of at least 300,000 Pa·s.

12. A multimodal polyethylene polymer according to claim 2 wherein the polymer has a dynamic viscosity, at a shear stress of 2.7 kPa, of at least 300,000 Pa·s.

13. A multimodal polyethylene polymer according to claim 1 wherein the polymer has a shear thinning index of 70 or greater.

14. A multimodal polyethylene polymer according to claim 2 wherein the polymer has a shear thinning index of 70 or greater.

15. A multimodal polyethylene polymer according to claim 3 wherein the polymer has a shear thinning index of 70 or greater.

16. A multimodal polyethylene polymer according to claim 1 wherein said shear thinning index is 100 or greater.

17. A multimodal polyethylene polymer according to claim 1 wherein the co-monomer of the high molecular weight ethylene copolymer is a $C_6$ to $C_{12}$ alpha-olefin.

18. A multimodal polyethylene polymer according to claim 2 wherein the co-monomer of the high molecular weight ethylene copolymer is a $C_6$ to $C_{12}$ alpha-olefin.

19. A multimodal polyethylene polymer according to claim 3 wherein the co-monomer of the high molecular weight ethylene copolymer is a $C_6$ to $C_{12}$ alpha-olefin.

20. A multimodal polyethylene polymer comprising a low molecular weight ethylene homo-polymer fraction and a high molecular weight ethylene copolymer fraction, wherein:
   (a) the low molecular weight fraction is present in an amount of 47 to 52% by weight, and has a weight average molecular weight of from about 5,000 to about 50,000 g/mol;
   (b) the high molecular weight fraction is present in an amount of 48 to 53% by weight, and has a weight average molecular weight of from about 300,000 to 900,000 g/mol;
   (c) the multimodal polymer has a MFR$_5$ of greater than 0.10 g/10 min and less than or equal to 0.22 g/10 min; and
   (d) the multimodal polymer has a density of greater than or equal to 952 kg/m$^3$.

* * * * *